US011548523B2

(12) United States Patent
Caprasecca et al.

(10) Patent No.: US 11,548,523 B2
(45) Date of Patent: Jan. 10, 2023

(54) SYSTEMS AND METHODS FOR IMPROVED DRIVER SAFETY ANALYTICS

(71) Applicant: Verizon Connect Development Limited, Dublin (IE)

(72) Inventors: Stefano Caprasecca, Florence (IT); Tommaso Mugnai, Figline e Incisa Valdarno (IT)

(73) Assignee: Verizon Connect Development Limited, Dublin (IE)

( * ) Notice: Subject to any disclaimer, the term of this patent is extended or adjusted under 35 U.S.C. 154(b) by 84 days.

(21) Appl. No.: 17/313,138

(22) Filed: May 6, 2021

(65) Prior Publication Data
US 2021/0253122 A1    Aug. 19, 2021

Related U.S. Application Data

(63) Continuation of application No. 16/697,297, filed on Nov. 27, 2019, now Pat. No. 11,014,578.

(51) Int. Cl.
*B60W 50/14* (2020.01)
*G08G 1/052* (2006.01)
*G08G 1/01* (2006.01)
*B60W 40/105* (2012.01)
*G06N 20/00* (2019.01)

(52) U.S. Cl.
CPC .......... *B60W 50/14* (2013.01); *B60W 40/105* (2013.01); *G06N 20/00* (2019.01); *G08G 1/0112* (2013.01); *G08G 1/052* (2013.01); *B60W 2050/146* (2013.01); *B60W 2554/00* (2020.02); *B60W 2556/45* (2020.02)

(58) Field of Classification Search
CPC ............ B60W 50/14; B60W 2050/146; G08G 1/0112; G08G 1/052
See application file for complete search history.

(56) References Cited

U.S. PATENT DOCUMENTS

| | | | |
|---|---|---|---|
| 9,100,789 B2 | 8/2015 | Moeller | |
| 10,161,758 B2* | 12/2018 | Hiestermann | .......... G01C 21/32 |
| 10,267,643 B2 | 4/2019 | Mitchell et al. | |
| 2018/0086307 A1* | 3/2018 | Spina | ........................ G06T 7/11 |

* cited by examiner

*Primary Examiner* — Kam Wan Ma

(57) ABSTRACT

A device receives location data that identifies geographic locations of a vehicle at corresponding times, and speed data that identifies respective speeds of the vehicle at the set of corresponding times. The device identifies, based on the location data, speed limit data that identifies respective speed limits at the geographic locations. The device determines, based on the respective speeds and the respective speed limits, a set of respective relative speed values associated with the vehicle. The device identifies respective relative speed values, of the set of respective relative speed values, that exceed a threshold. The device determines, based on the respective relative speed values, a univocal speed indicator that represents an overall degree to which the respective relative speed values exceed the threshold, during a time interval that includes the corresponding times. The device performs a set of actions based on the univocal speed indicator.

20 Claims, 8 Drawing Sheets

SYSTEMS AND METHODS FOR IMPROVED DRIVER SAFETY ANALYTICS

RELATED APPLICATION

This application is a continuation of U.S. patent application Ser. No. 16/697,297, entitled "SYSTEMS AND METHODS FOR IMPROVED DRIVER SAFETY ANALYTICS," filed Nov. 27, 2019, which is incorporated herein by reference in its entirety.

BACKGROUND

Location data may identify a location of a vehicle at a particular time. Speed data may identify a speed at which the vehicle is driving during the particular time. Speed limit data may identify a speed limit of a road on which the vehicle is driving during the particular time. A device may, based on the location data, the speed data, and/or the speed limit data, determine an average vehicle speed for the vehicle over time, flag instances where the vehicle speed has exceeded the speed limit, and/or the like.

DETAILED DESCRIPTION OF PREFERRED EMBODIMENTS

Figure 1A:
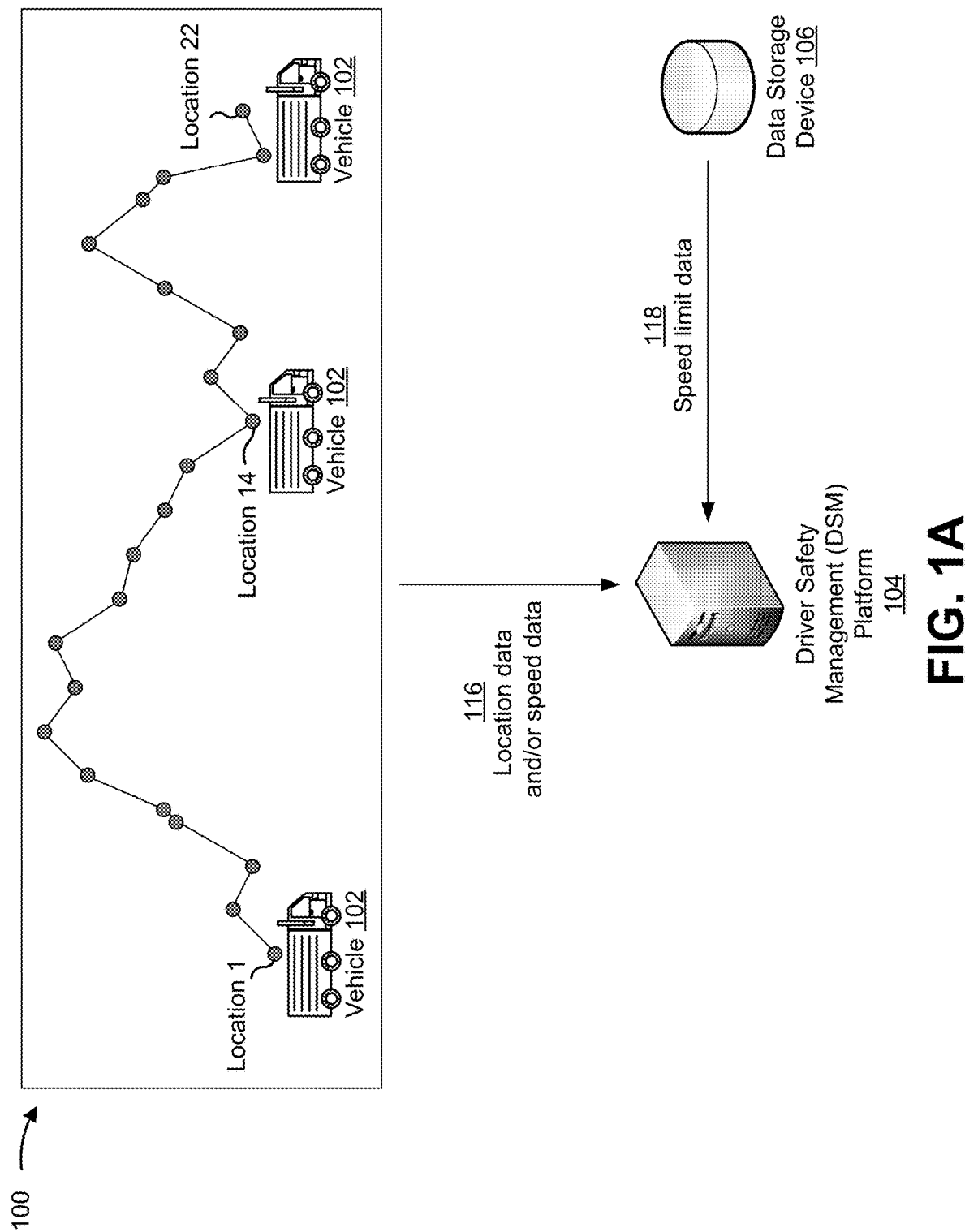
FIGS. 1A-1E are diagrams of one or more example implementations described herein.

The following detailed description of example implementations refers to the accompanying drawings. The same reference numbers in different drawings may identify the same or similar elements.

Some systems may include sensors and/or computing devices for attempting to manage driver safety for a group of drivers that operate vehicles of an organization, a company, a fleet, and/or the like. For example, such a system may manage a dataset that includes data that identifies an average vehicle speed for each respective vehicle, data that identifies speed limits for particular roads, data that flags particular vehicles that have been identified as exceeding a speed limit, and/or the like.

However, such systems are unable to provide a singular metric that reflects a multitude of different driving behaviors that drivers may exhibit over time. For example, an average vehicle speed of a vehicle over time might be the same for two vehicles, even if drivers of those vehicles exhibit different driving behaviors. As an example, a first driver may have been speeding frequently at speeds slightly above the speed limit, and a second driver may have been speeding infrequently at speeds significantly above the speed limit. In some cases, vehicles driven by the first and second driver may have the same average speed, despite exhibiting vastly different driving behaviors, and systems with metrics based on average speed are unable to distinguish between those two different driving behaviors.

Furthermore, without a singular metric to reflect the multitude of different driving behaviors exhibited by drivers, such systems are unable to effectively manage driver safety, unable to effectively compare behaviors of different drivers to each other, and/or the like. For example, such a system may perform a set of actions to improve driver safety and/or to reduce a likelihood of vehicle collision, and may, without the singular metric, perform incorrect actions, perform correct actions inefficiently, and/or the like. As another example, the system may be unable to present a displayed comparison of the behaviors of different drivers in a manner that is easily understood by users.

Some implementations described herein provide for a driver safety management (DSM) platform to determine and display a univocal speeding indicator. For example, the DSM platform may receive location data that identifies a set of geographic locations of a vehicle at a set of corresponding times, and speed data that identifies respective speeds of the vehicle at the set of corresponding times. This may allow the DSM platform to identify speed limit data that identifies respective speed limits at the set of geographic locations, and to determine, based on the respective speeds and the respective speed limits, a set of respective relative speed values associated with the vehicle.

Furthermore, the DSM platform may identify a subset of the set of respective relative speed values that satisfy a threshold and that specify a degree to which the vehicle is speeding at respective times. This may allow the DSM platform to determine, based on the subset of respective relative speed values, a univocal speed indicator that represents an overall degree to which the vehicle was speeding over the time interval. Additionally, the DSM platform may generate, based on the univocal speed indicator, an interface to display a graphical image, may provide the interface for display on another device, and/or may perform one or more actions based on the univocal speed indicator.

By determining the univocal speeding indicator in a manner that reflects a total degree to which the vehicle is speeding and a total time during which the vehicle is speeding, the DSM platform determines a single, uniform metric that captures and distinguishes between a multitude of different behaviors exhibited by drivers. This conserves resources (e.g., processing resources, network resources, memory resources, and/or the like) relative to an inferior platform that determines multiple metrics that are unsuitable to be compared to each other, conserves resources by performing correct actions and/or efficient actions based on the univocal speeding indicator, and/or the like. In some cases, the DSM platform may implement a configurable threshold to use when identifying the respective relative speed values, thereby allowing the univocal speeding indicator to be customizable to fit the needs of different users. Furthermore, by determining the univocal speed indicator, the DSM platform determines a metric that may be compared to corresponding metrics of other drivers, even if the corresponding metrics are determined based on different data points, over different time intervals, and/or the like.

FIGS. 1A-1E are diagrams of one or more example implementations 100 described herein. Example implementation(s) 100 may include a vehicle 102, a driver safety management (DSM) platform 104, a data storage device 106, a user device associated with a fleet manager (shown as fleet manager device 108), a user device associated with a driver (shown as driver user device 110), a server that supports an account of a user (shown as user account server 112), and/or an insurance server 114. As shown in FIGS. 1A-1E, DSM platform 104 may determine a univocal speed indicator for a driver of a vehicle, may generate and display an interface that includes a graphical image associated with the univocal speed indicator, and may perform one or more actions based on the univocal speed indicator.

As shown in FIG. 1A, and by reference number 116, DSM platform 104 may receive location data and/or speed data. For example, vehicle 102 and/or driver user device 110 may be configured to periodically provide DSM platform 104 with location data and/or speed data that may be used to determine the univocal speed indicator for the driver.

Vehicle 102 may include a ground vehicle (e.g., a truck, a car, a motorcycle, and/or the like), an aerial vehicle (e.g., a plane, a helicopter, and/or the like), a watercraft (e.g., a boat, a submarine, and/or the like), an autonomous vehicle, and/or the like. Driver user device 110 may include a mobile device of the driver, such as a smartphone, a laptop computer, and/or the like.

The location data may identify a set of geographic locations of vehicle 102 at a set of corresponding times. For example, the location data may identify geographic coordinates of each respective geographic location. The speed data may identify respective speeds of vehicle 102 at the set of corresponding times. For example, the speed data may identify a number of kilometers per hour (kph) at which vehicle 102 is traveling at a particular time. In other cases, the speed data may be represented using other types of distance over time metrics, such as miles per hour, and/or the like.

In some implementations, DSM platform 104 may receive the location data from a location sensor associated with vehicle 102. The location sensor may, for example, be part of an in-vehicle navigation system, a global positioning system (GPS) navigation system, an infotainment system, and/or the like, that is used to capture and provide the location data to DSM platform 104. Additionally, or alternatively, DSM platform 104 may receive the location data from a location sensor associated with driver user device 110. The location sensor associated with driver user device 110 may include a GPS sensor, a gyroscope, a proximity sensor, and/or the like.

Additionally, or alternatively, DSM platform 104 may receive the speed data from a speed sensor associated with vehicle 102. The speed sensor associated with vehicle 102 may include a tachometer, a GPS device, a speedometer, and/or the like. Additionally, or alternatively, DSM platform 104 may receive the speed data from a speed sensor associated with driver user device 110. The speed sensor associated with driver user device 110 may include a speedometer, an accelerometer, and/or the like. In some cases, a sensing element associated with driver user device 110 may capture the speed data. For example, an application hosted on and/or accessible to driver user device 110 may capture the speed data.

In some implementations, a location sensor (e.g., the location sensor associated with vehicle 102 and/or the location sensor associated with driver user device 110) may be configured to periodically provide the location data to DSM platform 104. For example, the location sensor may be configured to provide DSM platform 104 with location data at configured times and/or time intervals, during times where vehicle 102 is in motion, based on a condition being satisfied, and/or the like. Additionally, or alternatively, a speed sensor (e.g., the speed sensor associated with vehicle 102 and/or the speed sensor associated with driver user device 110) may be configured in a similar manner.

In some implementations, DSM platform 104 may receive other data from vehicle 102 and/or driver user device 110. For example, DSM platform 104 may receive a vehicle identifier that identifies vehicle 102, a driver identifier that identifies the driver of the vehicle, and/or the like.

As shown by reference number 118, DSM platform 104 may receive, from data storage device 106, speed limit data that identifies respective speed limits at the set of geographic locations. For example, data storage device 106 may use a data structure to associate location data for a geographic region (e.g., a city, a state, a country, and/or the like) with a master dataset of speed limit data that identifies speed limits of roads within the geographic region. In this case, DSM platform 104 may reference the data structure (e.g., using the location data) to identify the speed limit data that identifies the respective speed limits at the set of geographic locations.

In this way, DSM platform 104 receives data that may be used to determine the univocal speed indicator for the driver of vehicle 102.

Figure 1B:
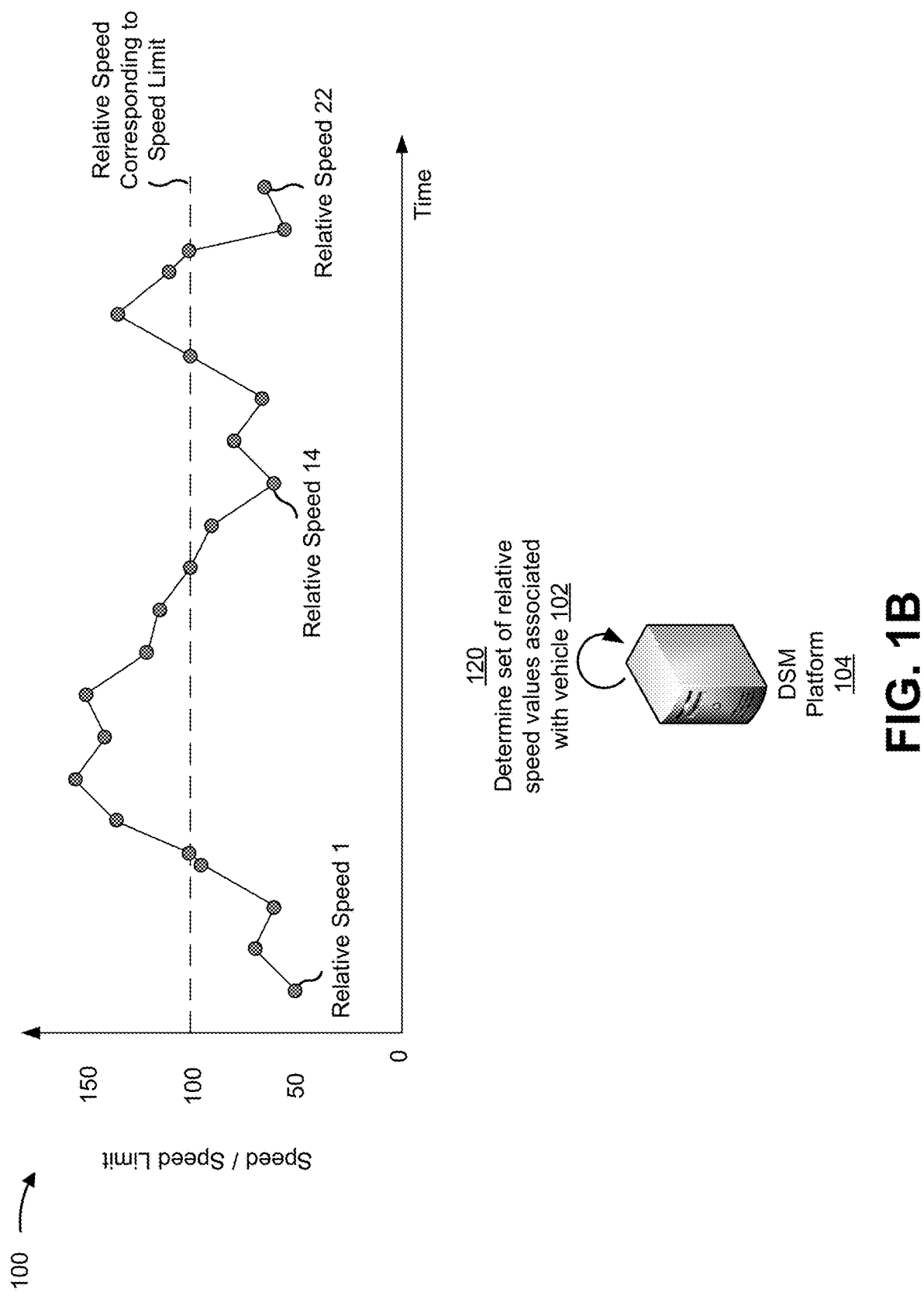

As shown in FIG. 1B, and by reference number 120, DSM platform 104 may determine a set of relative speed values associated with vehicle 102. For example, DSM platform 104 may determine a set of relative speed values that identify a set of relative speeds of vehicle 102 and that correspond to the set of geographic locations. A relative speed value may represent a relationship between a speed and a speed limit, a degree to which vehicle 102 is over or under a speed limit, and/or the like.

In some implementations, DSM platform 104 may determine a relative speed value that identifies a relative speed of vehicle 102. For example, DSM platform 104 may divide a speed value that identifies a speed of vehicle 102 at a given geographic location by a speed limit value that corresponds to that geographic location. In some cases, DSM platform 104 may multiply the relative speed value by 100 to represent the relative speed value using a whole number. In some implementations, DSM platform 104 may normalize a corresponding time value. For example, DSM platform 104 may standardize the corresponding time value by converting the corresponding time value to a value between zero and one.

In the example shown, DSM platform 104 determines relative speed values for twenty-two data points (shown by 22 dots on a graph). In this example, DSM platform 104 may, for each data point, divide a speed value by a corresponding speed limit value and may multiply the quotient by 100.

In this way, DSM platform 104 determines relative speed values that may be used for determining the univocal speed indicator.

Figure 1C:
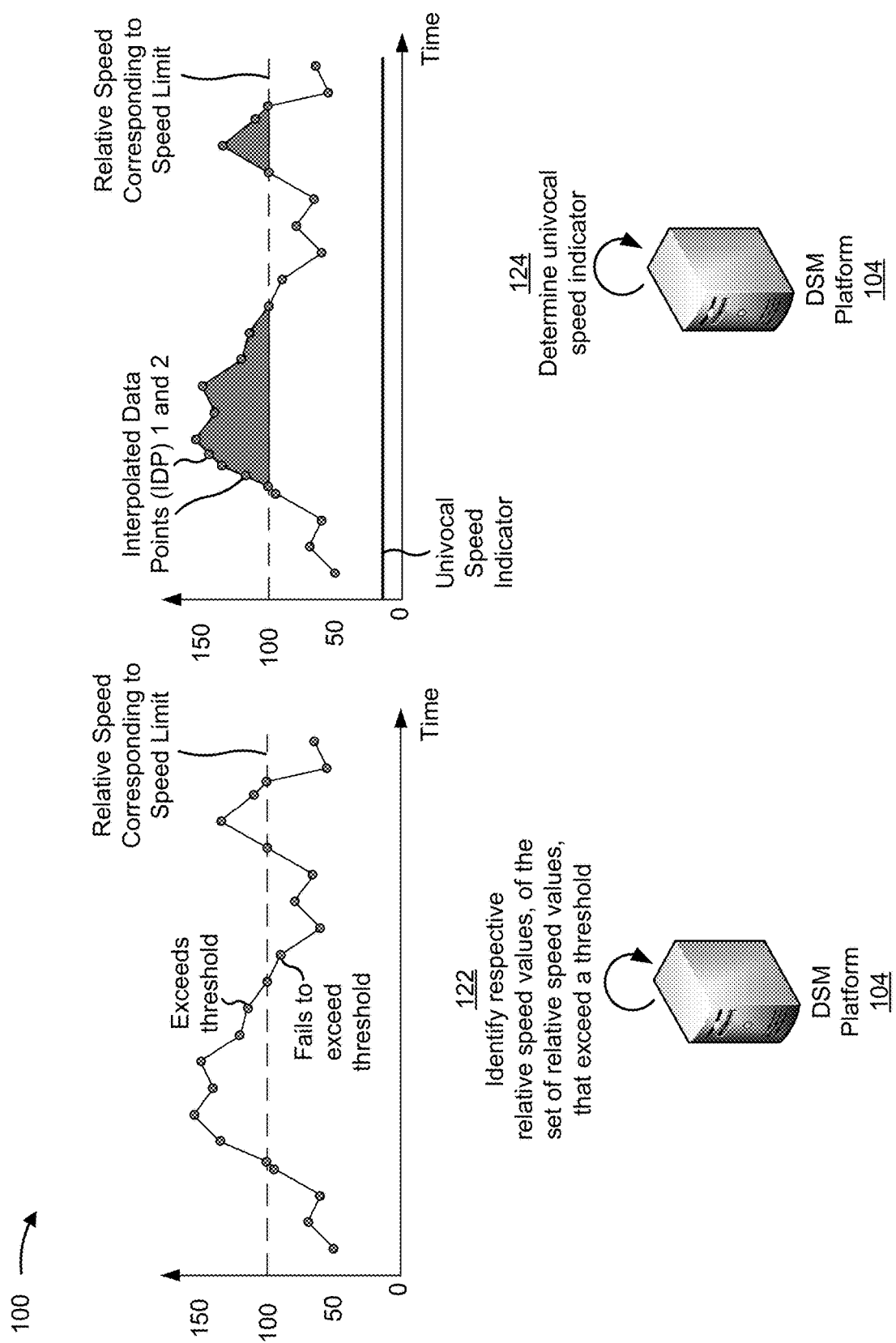

As shown in FIG. 1C, and by reference number 122, DSM platform 104 may identify respective relative speed values, of the set of relative speed values, that exceed a threshold. For example, DSM platform 104 may compare each relative speed value, of the set of relative speed values, with a threshold associated with the speed limit. The threshold may be a configurable value (e.g., a normalized number, a percentage, and/or the like) that corresponds to a particular relative speed, a configurable value that corresponds to a speed limit of a given geographic location, a value that corresponds to a relative speed that is determined based on a speed that is above or below the speed limit (e.g., as will be described further herein), and/or the like.

In some implementations, DSM platform 104 may identify a relative speed value that exceeds a threshold. For example, DSM platform 104 may be configured with a threshold that corresponds to a speed limit of a given geographic location. In this case, DSM platform 104 may compare the relative speed value and the threshold to determine that the relative speed value exceeds the threshold. In the example shown, the dotted line of the graph may represent a threshold that corresponds to a speed limit of a road on which vehicle 102 is traveling, and data points above the dotted line may correspond to relative speed values that exceed the threshold. In some cases, the threshold may correspond to a specific relative speed, such that the same threshold is used for identifying the respective relative speed values, even if vehicle 102 travels on roads with different speed limits.

In some implementations, DSM platform 104 may be configured with a threshold that corresponds to a relative speed that is above and/or below a relative speed that corresponds to driving at the speed limit. For example, if an organization employs a group of drivers that operate a fleet of vehicles, a fleet manager may want a univocal speed indicator that effectively penalizes drivers who drive significantly above the speed limit (and/or that effectively rewards drivers who drive at or near the speed limit). Consequently, DSM platform 104 may be configured with a threshold that corresponds to a relative speed, where the relative speed was determined based on a speed that is slightly above the speed limit, such that relative speed values for speeds that are slightly above the speed limit would not exceed the threshold.

Using the example shown in FIG. 1C, DSM platform 104 might be configured with a threshold that corresponds to a relative speed of 105 (5% above the speed limit). In this example, when DSM platform 104 identifies the respective relative speed values that exceed the threshold, the identified respective relative speed values will exclude relative speed values that correspond to speeds less than 5% above the speed limit. In this way, the threshold may be customized in a manner that penalizes and/or rewards drivers with specific driving behaviors, customized in a manner that fit the needs of specific users and/or fleet managers, and/or the like.

Some implementations described herein refer to relative speeds and/or thresholds. It is to be understood that this is provided by way of example, and that in practice, absolute speeds and/or thresholds may be implemented. For example, rather than implement the threshold that corresponds to the relative speed of 105 (5% above the speed limit), the threshold may be expressed in absolute terms (e.g., by subtracting 5 mph from each data point before determining relative speeds).

In some implementations, DSM platform 104 may use a data model to predict and set the threshold. For example, DSM platform 104 may have access to a data model that has been trained using machine learning and may use the data model to predict and set the threshold to an appropriate value, as further described below.

In some implementations, DSM platform 104 may have trained the data model to determine an overall univocal speed indicator for a group of drivers that had previously operated vehicles at the set of geographic locations. For example, DSM platform 104 (or the other device) may have trained the data model by using one or more machine learning techniques to process historical data, such as historical speed data, historical speed limit data, historical relative speed data, and/or the like. The one or more machine learning techniques may include a regression-based technique, a classification-based technique, a clustering-based technique, a technique using a neural network, and/or the like.

Additionally, DSM platform 104 may use the one or more machine learning techniques to process the historical data to identify geographic areas that would benefit from setting more stringent (and/or less stringent) thresholds. For example, a more stringent threshold for a region might cause drivers who speed in that region to receive lower univocal speed indicators, thereby serving as a deterrent to prevent those drivers from continuing to speed in that region. A region may benefit from a more stringent threshold if the region is determined to have a large quantity of drivers who drive above the speed limit (e.g., relative to an average or baseline quantity of drivers), if the region is determined to have a large quantity of drivers who often drive significantly above the speed limit (relative to an average or baseline quantity of drivers), and/or the like. A region may benefit from setting a less stringent threshold for similar reasons (e.g., a lower quantity of drivers who drive above the speed limit relative to an average or baseline, a lower quantity of drivers who driver significantly above the speed limit, and/or the like). This may allow DSM platform 104 to train the data model to receive, as an input, location data, speed data, speed limit data, and/or relative speed data for particular geographic locations and to output an overall univocal speed indicator for a group of drivers that operated vehicles at the particular geographic locations. Furthermore, DSM platform 104 may be configured to set an appropriate threshold based on the overall univocal speed indicator.

To use the trained data model, DSM platform 104 may provide, as input to the data model, the location data, the speed data, the speed limit data, and/or the relative speed data for vehicle 102, to cause the data model to output an overall univocal speed indicator for a group of drivers that had previously operated vehicles at the set of geographic locations. Additionally, DSM platform 104 may set the threshold based on the overall univocal speed indicator. For example, if it is common for vehicles to speed at a particular geographic location, of the set of geographic locations, the overall univocal speed indicator may cause DSM platform 104 to set the threshold to a value that is lower than a default configured value (e.g., a value corresponding to driving at the speed limit). In this way, DSM platform 104 automatically sets the threshold to a value that encourages safe driving in high-risk areas, deters drivers from speeding in high-risk areas, and/or the like.

In some implementations, DSM platform 104 may determine other respective relative speed values. For example, DSM platform may determine other respective relative speed values for other times (e.g., that are different from the set of corresponding times) by using linear interpolation to interpolate the other respective relative speed values. The other respective relative speed values may be values that are between the identified respective relative speed values. Linear interpolation may include first-order linear interpolation, bi-linear interpolation, polynomial interpolation, and/or the like.

As an example, the graph shown in FIG. 1C includes twelve data points that may have been identified as exceeding the threshold (e.g., and/or being equal to the threshold). In this case, DSM platform 104 may use linear interpolation to interpolate other respective relative speed values that correspond to other data points on the graph that are located at positions between each identified respective relative speed value. As an example, the second graph in FIG. 1C shows interpolated data points 1 and 2 as being located at positions between data points that had been previously identified as exceeding the threshold.

In some cases, DSM platform 104 may interpolate other relative speed values based on one relative speed value that exceeds the threshold and one relative speed value that fails to exceed the threshold. For example, two relative speed values may correspond to neighboring data points on the graph and may include a first relative speed value that fails to exceed the threshold and a second relative speed value that exceeds the threshold. In this case, DSM platform 104 may use linear interpolation to replace the first relative speed value with a third relative speed value that corresponds to a data point of the graph that is halfway between a corresponding speed limit value and a midpoint between the first and second relative speed value (e.g., a data point corresponding to an average relative speed value between the first and second relative speed value).

By using linear interpolation to determine the other data points, DSM platform 104 may determine the univocal speed indicator without needing data points to be evenly distributed over a given time period.

As shown by reference number 124, DSM platform 104 may determine a univocal speed indicator. For example, DSM platform 104 may determine the univocal speed indicator based on the respective relative speed values and/or the other respective relative speed values. The univocal speed indicator may represent an overall degree and/or an average degree to which the respective relative speed values exceed the threshold during a given time interval (e.g., that includes the times that correspond to the set of geographic locations).

In some implementations, DSM platform 104 may determine a univocal speed indicator based on an area of one or more polygons of the graph that includes data points corresponding to the respective relative speed values (and/or to the other respective relative speed values). Additionally, the threshold may be represented on the graph as a horizontal line that corresponds to a particular configured relative speed value (shown as a relative speed value that is equal to the speed limit). Consequently, the horizontal line and the data points that exceed the threshold may form one or more polygons on the graph (shown as the gray area on the graph). In this case, DSM platform 104 may determine the area of the one or more polygons and may divide the area by a total time during which vehicle 102 was driving, in order to determine the univocal speed indicator.

In the example shown, DSM platform 104 may determine the univocal speed indicator based on an area of two polygons (shown as a first polygon with eight sides and a second polygon, a triangle, with three sides). For example, DSM platform 104 may execute a first function to determine an area of the first polygon and may execute a second function to determine an area of the second polygon. As a specific example, DSM platform 104 may determine the area of the second polygon (e.g., the triangle) using the following equation: $A=\frac{1}{2}b*h$, whereby b represent a base of the triangle and h represents a height of the triangle.

Additionally, DSM platform 104 may determine the univocal speed indicator for the driver of vehicle 102 based on the total area of the first and second polygons. For example, DSM platform 104 may determine the univocal speed indicator by executing a function that uses the following equation: Univocal Speed Indicator=(area of trapezoid+area of triangle/total drive time for vehicle 102).

In some implementations, DSM platform 104 may use another data model, that has been trained using machine learning, to determine a univocal safety indicator for the driver. For example, DSM platform 104 may have access to another data model that has been trained using machine learning to determine a univocal safety indicator for the driver. The univocal safety indicator may represent an overall degree to which the driver is a safe driver (e.g., relative to other drivers, relative to an average, and/or the like).

In some implementations, DSM platform 104 may have obtained historical data that is to be used to train the other data model. For example, DSM platform 104 may reference one or more data structures to obtain historical univocal speed indicators for a group of drivers, historical vehicle revolutions per minute (RPM) data that identifies a total RPM of an engine of a particular vehicle over the time interval, historical sensor data that identifies a set of trailing distances between the particular vehicle and another nearby vehicle, and/or the like. A trailing distance may refer to a distance between two vehicles (e.g., such as a distance that vehicle 102 is trailing behind another vehicle).

To provide an example of how historical data is collected, over time, as DSM platform 104 determines univocal speed indicators for particular vehicles, the univocal speed indicators may be stored using a data structure as historical univocal speed indicators. As another example, RPM data and/or sensor data associated with a group of vehicles may have been reported to data storage device 106 and/or to another storage device. For example, a sensor of a vehicle may have been configured to report the RPM data, such that the RPM data was stored as historical RPM data. As another example, a sensor of a vehicle, such as a sensor capable of emitting light, a light detection and ranging (LIDAR) sensor, and/or the like, may have been configured to generate and/or report the sensor data, such that the sensor data was stored as historical sensor data. In one or more of these examples, DSM platform 104 may reference a corresponding data structure to obtain the historical data that is to be used to train the other data model.

In some implementations, DSM platform 104 may have trained the other data model. For example, DSM platform 104 may have trained the other data model by using the one or more machine learning techniques (defined elsewhere herein) to process the historical data to identify features that impact a likelihood of a driver being a safe (or unsafe) driver. To provide an example, the features may include a feature indicating that a high univocal speed indicator (relative to other indicators in the historical data) decreases a likelihood of the driver being a safe driver, a feature indicating that a low univocal speed indicator increases a likelihood of the driver being a safe driver, a feature based on an aggregate and/or an average associated with one or more other features and/or historical univocal speed indicator values, and/or the like.

Additionally, or alternatively, and provided as another example, the set of features may include a feature indicating that a high RPM value decreases a likelihood of the driver being a safe driver, a feature indicating that a low RPM value increases a likelihood of the driver being a safe driver, a feature based on an aggregate and/or an average associated with one or more other features and/or historical RPM values, and/or the like. Additionally, or alternatively, and provided as another example, the set of features may include a feature indicating that a low trailing distance value decreases a likelihood of the driver being a safe driver (e.g., by being indicative of the driver having a high propensity to tailgate), a feature indicating that a high trailing distance value increases a likelihood of the driver being a safe driver (e.g., by being indicative of the driver having a low propensity to tailgate), a feature based on an aggregate and/or an average associated with one or more other features and/or historical sensor data values, and/or the like.

To use the other data model (that has been trained), DSM platform 104 may provide, as input to the other data model, the univocal speed indicator that has been determined for the driver of vehicle 102, RPM data for vehicle 102, and/or sensor data for vehicle 102, to cause the other data model to output the univocal safety indicator for the driver. The univocal safety indicator may be determined in a manner similar to that described in connection with determination of the univocal speed indicator. For example, the univocal safety indicator may be a value that is based on an average of safety scores that are computed based on the univocal speed indicator, the RPM data, and/or the sensor data, a value that is based on a weighted average of the safety scores (e.g., which may allow users to customize which input dataset is more important when considering driver safety), and/or the like.

In this way, DSM platform 104 determines a univocal speed indicator (and/or a univocal safety indicator) for the driver. Furthermore, because the univocal speed indicator is determined using normalized time values, the univocal speed indicator of the driver may be compared to any other univocal speed indicator of another driver, regardless of whether the driver and the other driver were driving over time periods of different durations, driving at different time periods, and/or the like. This ensures a fair comparison of univocal speed indicators between two or more drivers, thereby conserving resources (e.g., processing resources, memory resources, and/or the like) that an inferior platform would waste by comparing two different metric values that could be skewed by the context in which the two or more drivers were driving.

Figure 1D:
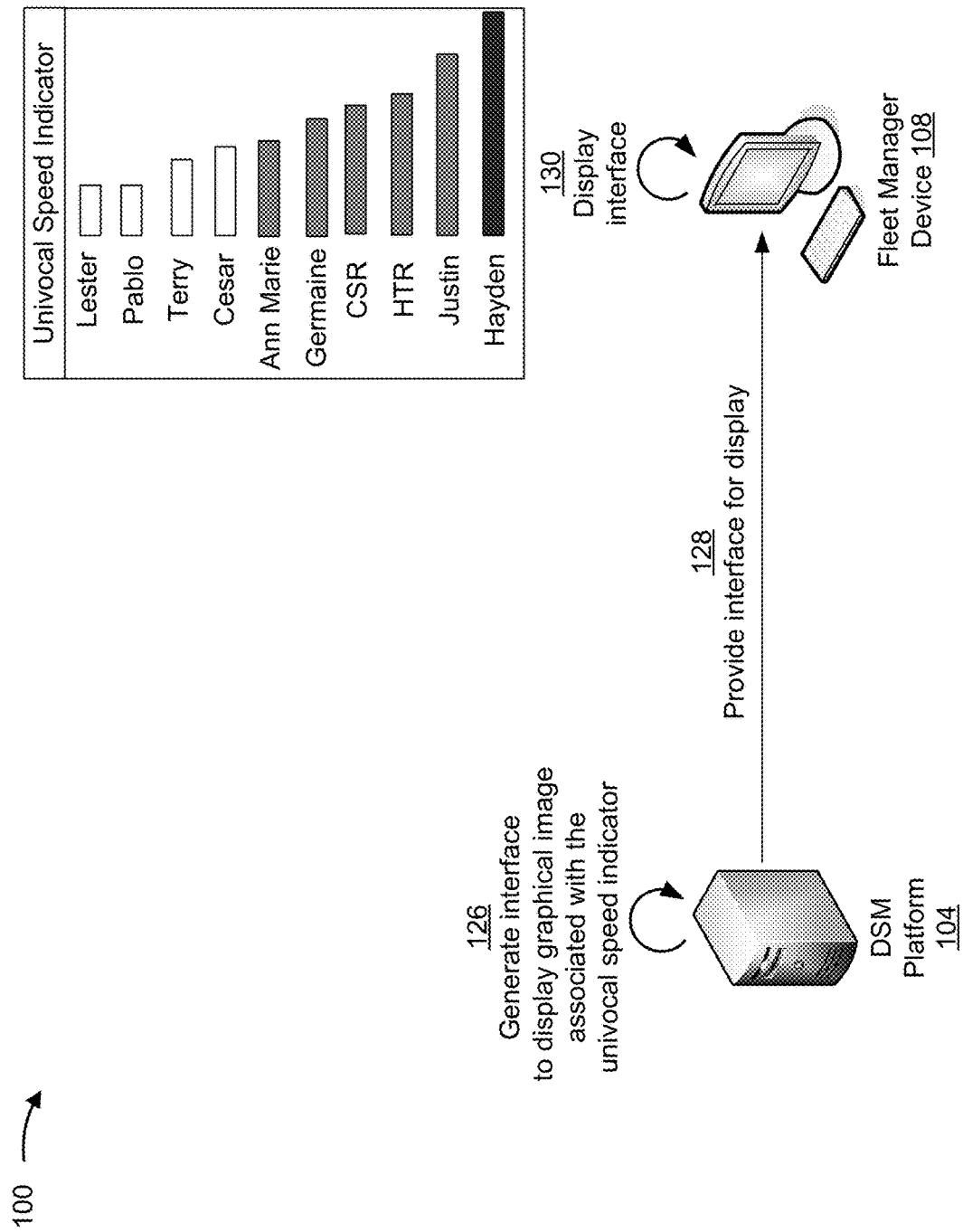

As shown in FIG. 1D, and by reference number 126, DSM platform 104 may generate an interface to display a graphical image associated with the univocal speed indicator. For example, DSM platform 104 may generate a web interface, an application interface, and/or the like, that includes a graphical image associated with the univocal speed indicator.

In some implementations, the graphical image may include a numerical and/or graphical representation of the univocal speed indicator, of one or more univocal speed indicators of other drivers, of the univocal safety indicator, of one or more other univocal safety indicators of the other drivers, and/or the like. Additionally, or alternatively, the graphical image may include additional data that is based on the univocal speed indicator and/or the univocal safety indicator, such as a color-coded display of indicators (e.g., the univocal speed indicator and/or the univocal safety indicator) based on whether particular indicators satisfy one or more threshold indicator values (shown in FIG. 1D using three colors that correspond to various ranges of univocal speed indicators), a display of indicators for one or more drivers over a configurable time interval, a recommendation and/or a notification for the driver (e.g., as further described in connection with FIG. 1E), and/or the like.

In some implementations, DSM platform 104 may generate the interface in a manner that allows the interface to be integrated into a safety management application and/or another type of application. For example, if an organization employs a group of drivers to operate a fleet of vehicles, the organization may use a safety management application that tracks one or more safety related metrics for the group of drivers. In this case, DSM platform 104 may generate the interface such that the interface may be integrated into an existing web site framework and/or an existing application framework.

Additionally, or alternatively, DSM platform 104 may generate the interface in a manner that allows the interface to be displayed via one or more other platforms and/or services. For example, DSM platform 104 may generate the interface in a manner that allows the interface to be displayed via a short message service (SMS), an electronic mail (e-mail) service, and/or the like.

In some implementations, another device may generate the interface. For example, DSM platform 104 may provide the univocal speed indicator (and/or the univocal safety indicator) to an application server that supports the safety management application. The univocal speed indicator (and/or the univocal safety indicator) may be provided using a communication interface (e.g., an application programming interface (API) and/or another type of interface), thereby allowing the application server to generate the interface. As another example, driver user device 110 may generate the interface. For example, driver user device 110 may be configured with the safety management application (e.g., which may include a function for generating the interface), may have a web browser plugin for generating and/or displaying the interface as part of a web browser, and/or the like. In other cases, the interface may be pre-configured and the univocal speed indicator (and/or the univocal safety indicator) may be displayed via the pre-configured interface.

As shown by reference number 128, DSM platform 104 may provide the interface for display. For example, DSM platform 104 may provide the interface for display on fleet manager device 108, on driver user device 110, and/or on one or more other devices. The interface may be provided via a communication interface, such as an API or another type of interface.

As shown by reference number 130, fleet manager device 108 may display the interface. For example, a fleet manager may log in to the safety management application, and the safety management application may display the interface. The safety management application may be hosted and/or supported by DSM platform 104, the application server, driver user device 110, and/or the like. The safety management application may be a web application, a mobile application, a desktop application, and/or the like.

Using the example shown, fleet manager device 108 may display the univocal speed indicator in association with the one or more other univocal speed indicators for the other drivers. This may allow the fleet manager to compare univocal speed indicators of each respective driver to identify which drivers are the least safe, and/or to perform one or more actions based on the comparison.

By determining the univocal speed indicator using normalized time values, the univocal speed indicator of the driver may be compared to any other univocal speed indicator of another driver, regardless of whether the driver and the other driver were driving over time periods of different durations, driving at different time periods, and/or the like. This ensures a fair comparison of univocal speed indicators between two or more drivers, thereby conserving resources relative to an inferior platform that might waste resources comparing two different metric values that could be skewed by the context in which the two or more drivers were driving.

In some cases, the univocal speed indicator displayed by the interface may allow the fleet manager to view a metric that differentiates between (and/or accounts for) a first driver that went slightly above a speed limit for a long period of time and a second driver that went significantly above the speed limit for a short period of time. Without the univocal speed indicator, an inferior platform would be unable to accurately differentiate between the behavior of each respective driver. For example, the inferior platform might determine multiple speed severity metrics, and may partition users into groups based on a degree to which each respective vehicle was traveling above the speed limit. However, the inferior platform would be unable to distinguish between drivers that exhibit two or more types of driving behaviors (e.g., such as when a first driver is driving slightly above a speed limit for an extended time period and a second driver is driving significantly above a speed limit for a brief time period).

In this way, DSM platform 104 causes the interface to display the graphical image associated with the univocal speed indicator (and/or the univocal safety indicator). Furthermore, displaying the graphical image, in a manner described herein, conserves space within the interface (e.g., relative to displaying multiple different metrics for measuring safety of drivers), ensures that the information for the driver is able to be compared to other drivers (e.g., even if the driver and the one or more other drivers exhibit different driving behaviors), and/or the like.

Figure 1E:
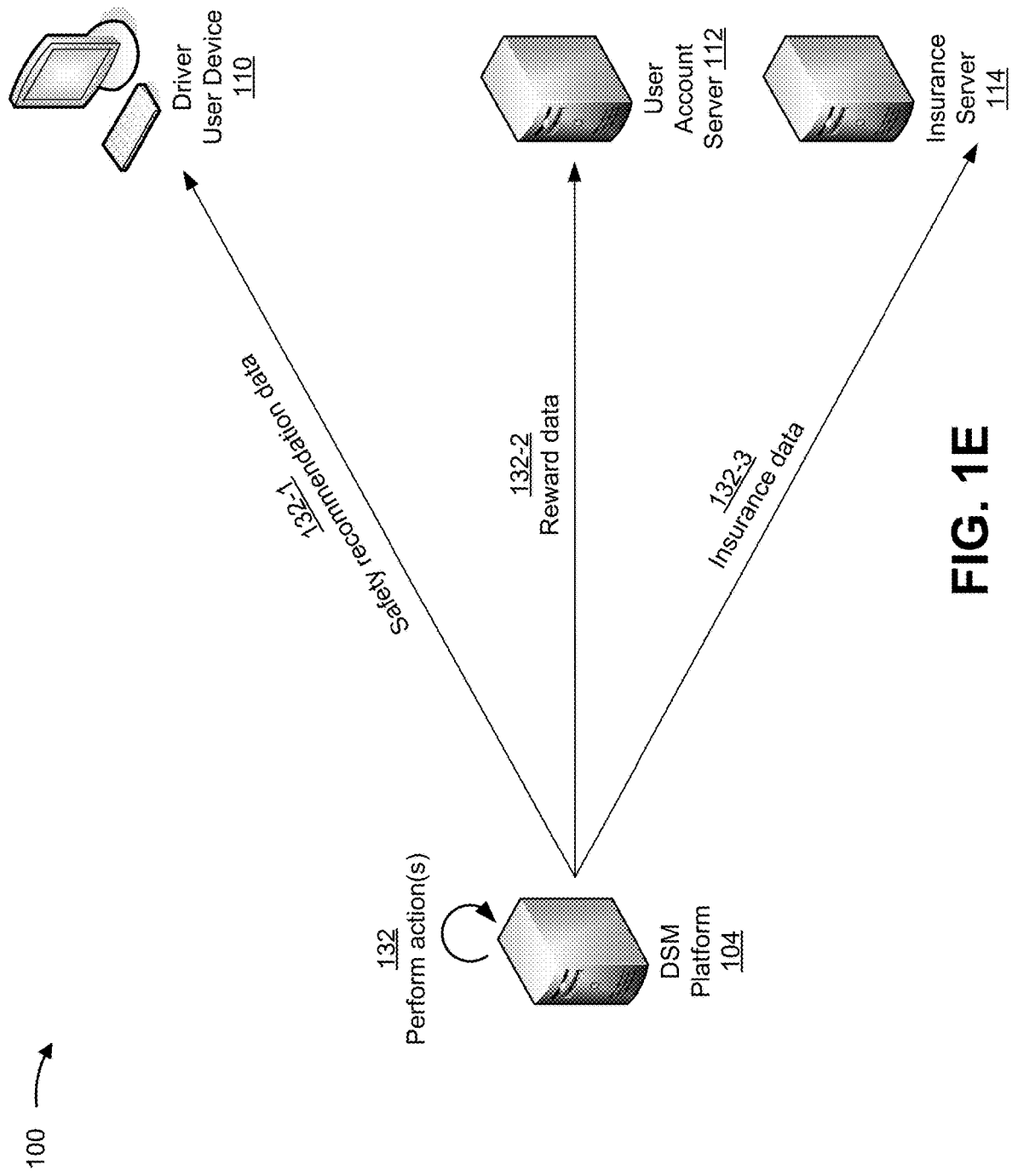

As shown in FIG. 1E, and by reference number 132, DSM platform 104 may perform one or more actions. For example, DSM platform 104 may perform a first group of actions to generate and/or provide safety recommendation data to driver user device 110, may perform a second group of actions to generate and provide reward data to user account server 112, may perform a third group of actions to generate and provide insurance data to insurance server 114, and/or the like, as further described below.

As shown by reference number 132-1, DSM platform 104 may generate and provide safety recommendation data to driver user device 110. For example, DSM platform 104 may generate safety recommendation data for a safety recommendation that has been selected from a set of safety recommendations. The set of safety recommendations may include a first recommendation to provide a driver with a safety tip, a second recommendation to complete a driver safety assignment, a third recommendation to complete a driver safety course, and/or the like. In other aspects, the DSM platform 104 may generate configuration changes for the vehicle associated with the driver, enforcing particular safety recommendations.

In some implementations, DSM platform 104 may map data that identifies the set of safety recommendations with specific univocal speed indicators, with specific ranges of univocal speed indicators, with specific univocal safety indicators, with specific ranges of univocal safety indicators, and/or the like. This may allow DSM platform 104 to reference the mapping to identify a particular safety recommendation associated with the univocal speed indicator and/or the univocal safety indicator.

In some implementations, DSM platform 104 may provide the recommendation data to driver user device 110 (and/or to another device). For example, DSM platform 104 may use a communication interface, such as an API or another type of interface to provide driver user device 110 (and/or to the other device) with the recommendation data.

Additionally, or alternatively, and as shown by reference number 132-2, DSM platform 104 may generate and provide reward data to user account server 112. For example, DSM platform 104 may generate reward data for a reward that has been selected from a set of rewards. The set of rewards may include a preference in vehicle to drive, a raise, a bonus, a trip, a quantity of points that may be saved and used for another reward, and/or the like.

In some implementations, DSM platform 104 may map data that identifies the set of rewards with specific univocal speed indicators, with specific ranges of univocal speed indicators, with specific univocal safety indicators, with specific ranges of univocal safety indicators, and/or the like. This may allow DSM platform 104 to reference the mapping to identify a particular reward associated with the univocal speed indicator and/or the univocal safety indicator.

In some implementations, DSM platform 104 may provide the reward data to user account server 112 (and/or to another device). For example, DSM platform 104 may use a communication interface, such as an API or another type of interface to provide user account server 112 (and/or to the other device) with the reward data.

Additionally, or alternatively, and as shown by reference number 132-3, DSM platform 104 may generate and provide insurance data to insurance server 114. For example, DSM platform 104 may generate insurance data for a recommendation to update an insurance plan of the driver, where the recommendation is selected from a set of insurance recommendations. The insurance data may include a recommendation to update a premium, to update a monthly payment, to update an insurance record with the univocal speed indicator and/or the univocal safety indicator, and/or the like.

In some implementations, DSM platform 104 may map data that identifies the set of insurance recommendations with specific univocal speed indicators, with specific ranges of univocal speed indicators, with specific univocal safety indicators, with specific ranges of univocal safety indicators, and/or the like. This may allow DSM platform 104 to reference the mapping to identify a particular recommendation that is associated with the univocal speed indicator and/or the univocal safety indicator.

In some implementations, DSM platform 104 may provide the insurance data to insurance server 114 (and/or to another device). For example, DSM platform 104 may use a communication interface, such as an API or another type of interface to provide insurance server 114 (and/or to the other device) with the insurance data.

Additionally, or alternatively, DSM platform 104 may train another data model to identify an action to perform based on a particular univocal speed indicator and/or a univocal safety indicator. The other data model may have been trained in a manner similar to that described in connection with other data models described herein. In this case, DSM platform 104 may provide, as input to the other data model, the univocal speed indicator and/or the univocal safety indicator to cause the other data model to output a value that corresponds to a particular action that is to be performed.

By determining the univocal speeding indicator in a manner that reflects a total degree to which the vehicle is speeding and a total time during which the vehicle is speeding, the DSM platform determines a uniform metric that captures a multitude of different behaviors exhibited by drivers. This conserves resources (e.g., processing resources, network resources, memory resources, and/or the like) relative to an inferior platform that determines multiple metrics that are unsuitable to be compared to each other, conserves resources by performing correct actions and/or efficient actions based on the univocal speeding indicator, and/or the like.

As indicated above, FIGS. 1A-1E are provided as an example. Other examples can differ from what is described with regard to FIGS. 1A-1E.

Figure 2:
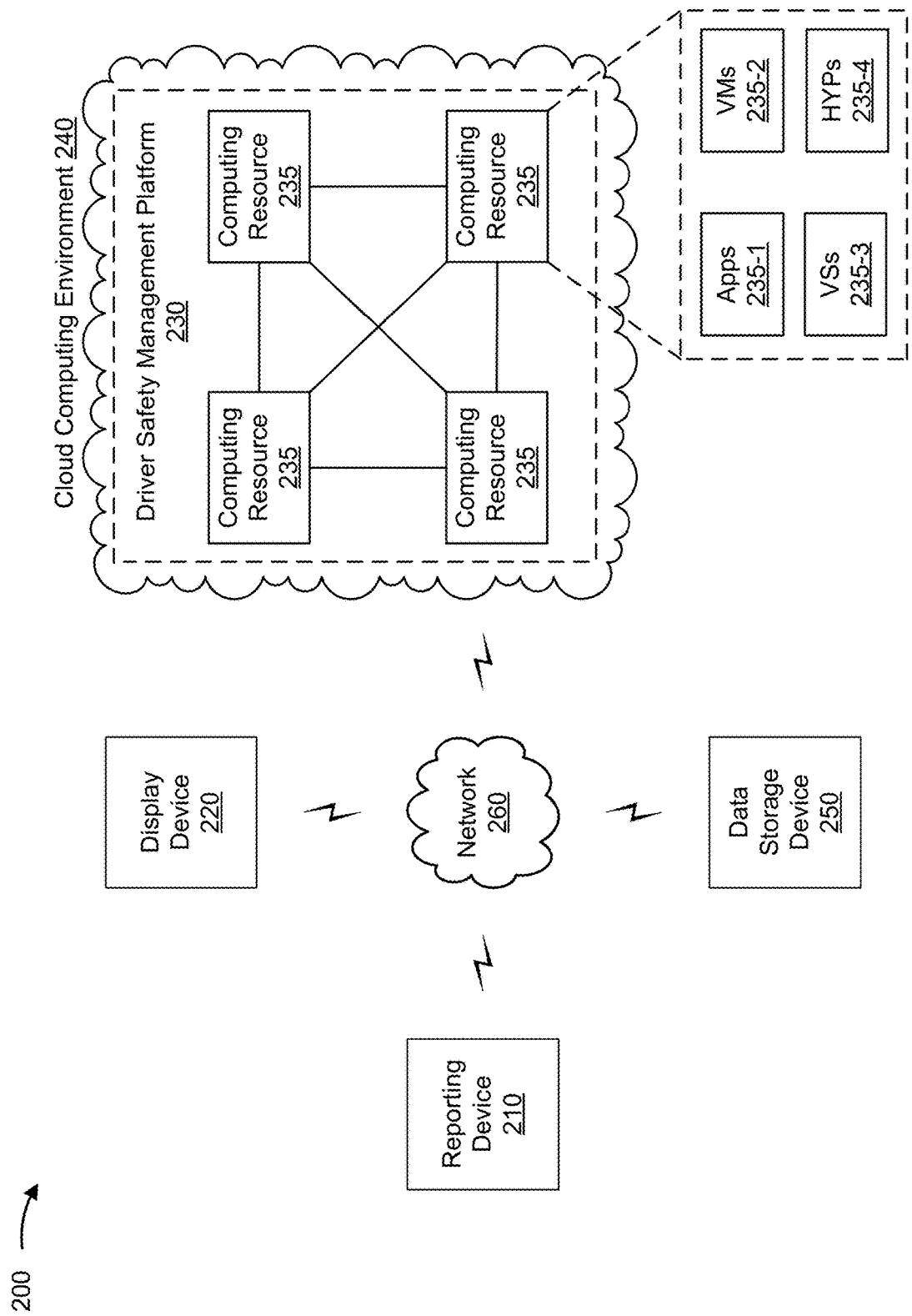
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a reporting device 210, a display device 220, a driver safety management (DSM) platform 230 hosted within a cloud computing environment 240, a data storage device 250, and/or a network 260. Devices of environment 200 may interconnect via wired connections, wireless connections, or a combination of wired and wireless connections.

Reporting device 210 includes one or more devices capable of receiving, generating, storing, processing, and/or providing data, such as data described herein. For example, reporting device 210 may include a user device 210-1, a vehicle 210-2, and/or another type of reporting device. For example, user device 210-1 may include a mobile phone (e.g., a smart phone, a radiotelephone, and/or the like), a laptop computer, a tablet computer, a desktop computer, a handheld computer, a gaming device, a wearable communication device (e.g., a smart watch, a pair of smart glasses, and/or the like), a mobile hotspot device, a fixed wireless access device, and/or a similar type of device. Additionally, or alternatively, and provided as another example, vehicle 210-2 may include a ground vehicle (e.g., a truck, a car, a motorcycle, and/or the like), an aerial vehicle (e.g., a plane, a helicopter, and/or the like), a watercraft (e.g., a boat, a submarine, and/or the like), an autonomous vehicle, and/or the like.

In some implementations, user device 210-1 may include a location sensor, a speed sensor, a distance sensor, and/or the like. The location sensor may include a device capable of detecting a location of user device 210-1, such as a global positioning system (GPS) sensor, a gyroscope, a proximity sensor, and/or the like. The speed sensor may include a device capable of detecting a speed of user device 210-1, such as a speedometer, an accelerometer, and/or the like. In some implementations, user device 210-1 may include one or more sensor elements, such as applications capable of capturing location data, speed data, and/or the like.

In some implementations, vehicle 210-2 may include one or more sensors, such as a location sensor, a speed sensor, a distance sensor, and/or the like. The location sensor may include a device capable of detecting a location of vehicle 210-2, such as a GPS device. The speed sensor may include a device capable of detecting a speed of vehicle 210-2, such as a tachometer, an odometer, a speedometer, and/or the like. The distance sensor may include a device capable of detecting a distance between vehicle 210-2 and another device or object, such as a light sensor, a laser-optic sensor, a camera (e.g., a front-view camera, a rearview camera, and/or the like), and/or the like. In some implementations, the one or more sensors may be part of an in-vehicle navigation system, a GPS navigation system, an infotainment system, and/or the like.

In some implementations, reporting device 210 may provide, to DSM platform 230, reporting data that includes location data, speed data, vehicle revolutions per minute (RPM) data, sensor data, and/or the like. For example, reporting device 210 may provide DSM platform 230 with the reporting data using one or more communication interfaces, such as an application programming interface (API) and/or another type of interface.

Display device 220 includes one or more devices capable of receiving, storing, generating, and/or providing data, such as data described herein. For example, display device 220 may include a user device (e.g., as defined in connection with user device 210-1), a server device, and/or the like. In some implementations, display device 220 may receive one or more univocal speed indicators, one or more univocal safety indicators, safety recommendation data, reward data, insurance data, and/or the like. In some implementations, display device 220 may display and/or be capable of displaying an interface that includes the graphical image associated with the one or more univocal speed indicators, the one or more univocal safety indicators, safety recommendation data, reward data, insurance data, and/or the like.

DSM platform 230 includes one or more devices capable of receiving, storing, generating, and/or providing data, such as data described herein. For example, DSM platform 230 may include a server device (e.g., a host server, a web server, an application server, and/or the like), a data center device, and/or a similar device. In some implementations, DSM platform 230 may host and/or support an application used to assist in managing safety of a group of drivers of vehicles 210-2. In some implementations, DSM platform 230 may host, support, and/or have access to one or more data models described herein.

In some implementations, as shown, DSM platform 230 may be hosted in a cloud computing environment 222. Notably, while implementations described herein describe DSM platform 230 as being hosted in cloud computing environment 222, in some implementations, DSM platform 230 may be non-cloud-based (i.e., may be implemented outside of a cloud computing environment) or may be partially cloud-based.

Cloud computing environment 222 includes an environment that may host DSM platform 230. Cloud computing environment 222 may provide computation, software, data access, storage, etc. services that do not require end-user knowledge of a physical location and configuration of system(s) and/or device(s) that host DSM platform 230. As shown, cloud computing environment 222 may include a group of computing resources 235 (referred to collectively as "computing resources 235" and individually as "computing resource 235").

Computing resource 235 includes one or more personal computers, workstation computers, server devices, or other types of computation and/or communication devices. In some implementations, computing resource 235 may host DSM platform 230. In some implementations, computing resource 235 may communicate with other computing resources 235 via wired connections, wireless connections, or a combination of wired and wireless connections.

As further shown in FIG. 2, computing resource 235 includes a group of cloud resources, such as one or more applications ("APPs") 235-1, one or more virtual machines ("VMs") 235-2, virtualized storage ("VSs") 235-3, one or more hypervisors ("HYPs") 235-4, and/or the like. The cloud resources may include compute instances executing in computing resource 235, storage devices provided in computing resource 235, data transfer devices provided by computing resource 235, etc.

Application 235-1 includes one or more software applications that may be provided to or accessed by reporting device 210, display device 220, and/or data storage device 250. Application 235-1 may eliminate a need to install and execute the software applications on reporting device 210, display device 220, and/or data storage device 250. For example, application 235-1 may include software associated with DSM platform 230 and/or any other software capable of being provided via cloud computing environment 222. In some implementations, application 235-1 may include an application to assist in managing safety of a group of drivers of vehicles 210-2. In some implementations, one application 235-1 may send/receive information to/from one or more other applications 235-1, via virtual machine 235-2.

Virtual machine 235-2 includes a software implementation of a machine (e.g., a computer) that executes programs like a physical machine. Virtual machine 235-2 may be either a system virtual machine or a process virtual machine, depending upon use and degree of correspondence to any real machine by virtual machine 235-2. A system virtual machine may provide a complete system platform that supports execution of a complete operating system. A process virtual machine may execute a single program and may support a single process. In some implementations, virtual machine 235-2 may execute on behalf of a user (e.g., a user of reporting device 210, display device 220, and/or data storage device 250, or an operator of DSM platform 230), and may manage infrastructure of cloud computing environment 222, such as data management, synchronization, or long-duration data transfers.

Virtualized storage 235-3 includes one or more storage systems and/or one or more devices that use virtualization techniques within the storage systems or devices of computing resource 235. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may provide administrators of the storage system with flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 235-4 may provide hardware virtualization techniques that allow multiple operating systems (e.g., "guest operating systems") to execute concurrently on a host computer, such as computing resource 235. Hypervisor 235-4 may present a virtual operating platform to the guest operating systems and may manage the execution of the guest operating systems. Multiple instances of a variety of operating systems may share virtualized hardware resources.

Data storage device 250 includes one or more devices capable of receiving, storing, generating, and/or providing data, such as data described herein. For example, data storage device 250 may include a server device or a group of server devices. In some implementations, a first data storage device 250 may store speed limit data and/or may provide the speed limit data to DSM platform 230. Additionally, or alternatively, one or more other data storage devices 250 may store historical data (described elsewhere herein) and may provide the historical data to DSM platform 230.

Network 260 includes one or more wired and/or wireless networks. For example, network 260 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, and/or the like, and/or a combination of these or other types of networks.

The number and arrangement of devices and networks shown in FIG. 2 are provided as one or more examples. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
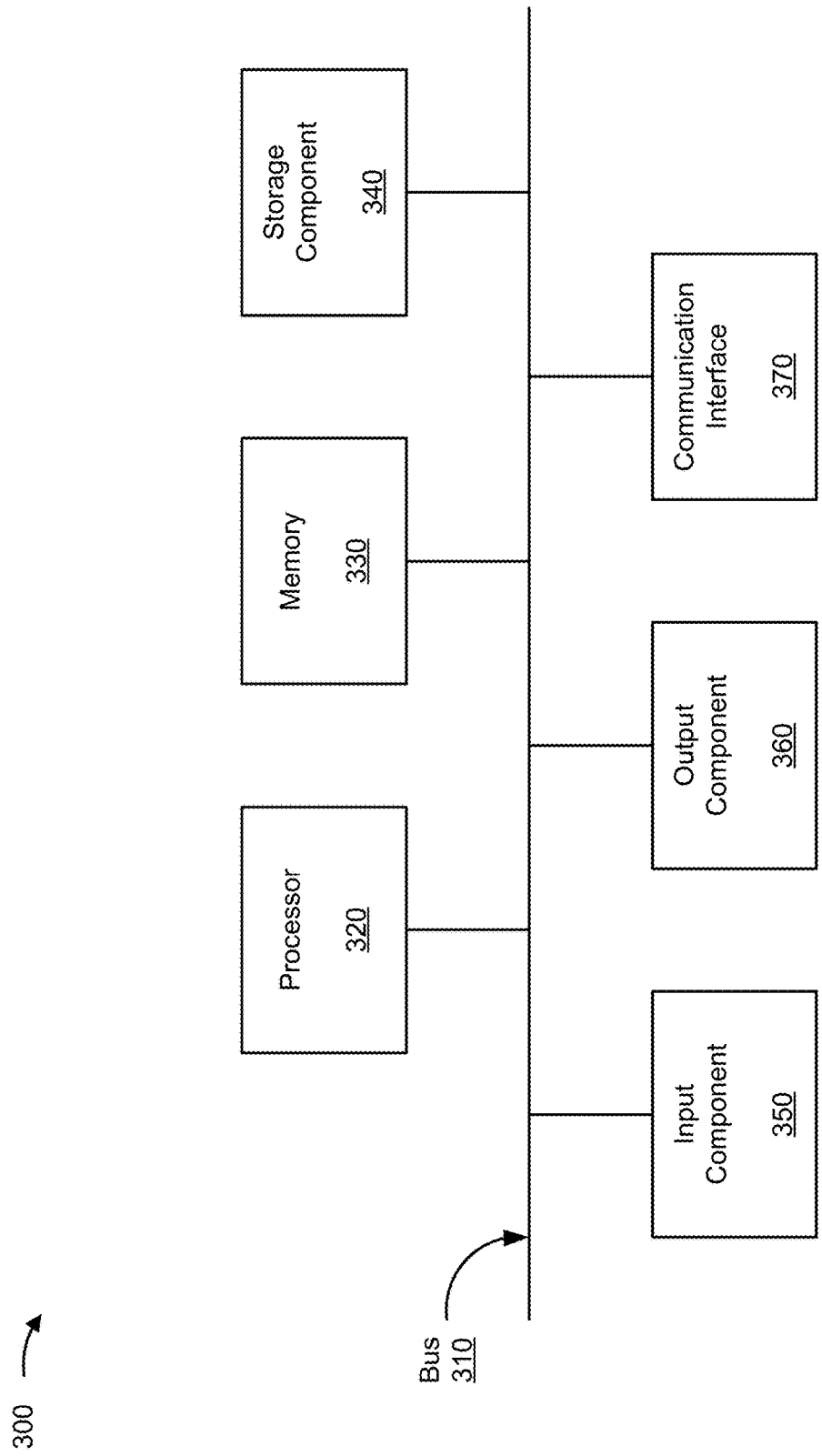
FIG. 3 is a diagram of example components of one or more devices of FIG. 2.

FIG. 3 is a diagram of example components of a device 300. Device 300 may correspond to reporting device 210, display device 220, DSM platform 230, and/or data storage device 250. In some implementations, reporting device 210, display device 220, DSM platform 230, and/or data storage device 250 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among multiple components of device 300. Processor 320 is implemented in hardware, firmware, and/or a combination of hardware and software. Processor 320 includes a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), and/or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, and/or a magneto-optic disk), a solid state drive (SSD), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a component for determining location (e.g., a global positioning system (GPS) component) and/or a sensor (e.g., an accelerometer, a gyroscope, an actuator, another type of positional or environmental sensor, and/or the like). Output component 360 includes a component that provides output information from device 300 (via, e.g., a display, a speaker, a haptic feedback component, an audio or visual indicator, and/or the like).

Communication interface 370 includes a transceiver-like component (e.g., a transceiver, a separate receiver, a separate transmitter, and/or the like) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a wireless local area network interface, a cellular network interface, and/or the like.

Device 300 may perform one or more processes described herein. Device 300 may perform these processes based on processor 320 executing software instructions stored by a non-transitory computer-readable medium, such as memory 330 and/or storage component 340. As used herein, the term "computer-readable medium" refers to a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardware circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
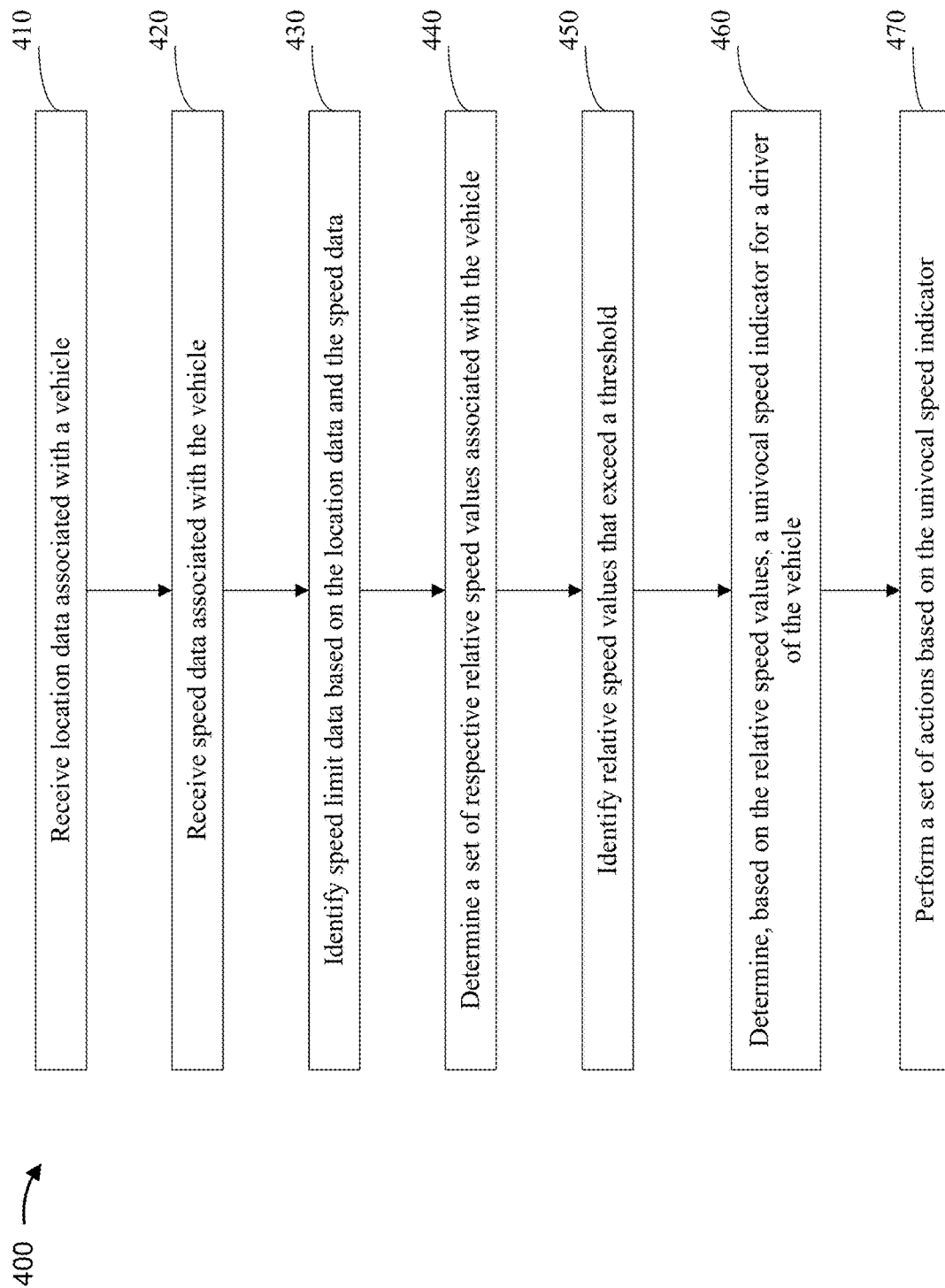
FIG. 4 is a flowchart of an example process for determining and displaying a univocal speed indicator for a driver of a vehicle.

FIG. 4 is a flow chart of an example process 400 for systems and methods for determining and displaying a univocal speed indicator for a driver of a vehicle. In some implementations, one or more process blocks of FIG. 4 may be performed by a driver safety management platform (e.g., DSM platform 230). In some implementations, one or more process blocks of FIG. 4 may be performed by another device or a group of devices separate from or including the DSM platform, such as a reporting device (e.g., reporting device 210, a display device (e.g., display device 220), a data storage device (e.g., data storage device 250), and/or the like.

As shown in FIG. 4, process 400 may include receiving location data associated with a vehicle (block 410). For example, the DSM platform (e.g., using computing resource 235, processor 320, memory 330, storage component 340, input component 350, communication interface 370, and/or the like) may receive location data associated with a vehicle. In some implementations, the DSM platform may receive the location data from a location sensor that identifies a set of geographic locations of the vehicle at a set of corresponding times, as described above.

As further shown in FIG. 4, process 400 may include receiving speed data associated with the vehicle (block 420). For example, the DSM platform (e.g., using computing resource 235, processor 320, memory 330, storage component 340, input component 350, communication interface 370, and/or the like) may receive speed data associated with the vehicle. In some implementations, the DSM platform may receive speed data from a speed sensor that identifies respective speeds of the vehicle at the set of corresponding times, as described above.

As further shown in FIG. 4, process 400 may include identifying speed limit data based on the location data and the speed data (block 430). For example, the DSM platform (e.g., using computing resource 235, processor 320, memory 330, storage component 340, input component 350, output component 360, communication interface 370, and/or the like) may identify speed limit data based on the location data and the speed data. In some implementations, the DSM platform may, based on the location data, identify speed limit data that identifies respective speed limits at the set of geographic locations, as described above.

As further shown in FIG. 4, process 400 may include determining a set of respective relative speed values associated with the vehicle (block 440). For example, the DSM platform (e.g., using computing resource 235, processor 320, memory 330, storage component 340, and/or the like) may determine a set of respective relative speed values associated with the vehicle. In some implementations, the DSM platform may determine, based on the respective speeds and the respective speed limits, a set of respective relative speed values associated with the vehicle, as described above.

As further shown in FIG. 4, process 400 may include identifying relative speed values that exceed a threshold (block 450). For example, the DSM platform (e.g., using computing resource 235, processor 320, memory 330, storage component 340, input component 350, output component 360, communication interface 370, and/or the like) may identify relative speed values that exceed a threshold. In some implementations, the DSM platform may identify respective relative speed values, of the set of respective relative speed values, that exceed a threshold, as described above. In some implementations, for each time in the set of corresponding times, the threshold may be based on a respective speed limit.

In some implementations, the DSM platform may determine, by using a data model that has been trained using machine learning based on historical speed data, an overall univocal speed indicator for a group of drivers that operated vehicles at the set of geographic locations. In some implementations, the DSM platform may set the threshold based on the overall univocal speed indicator.

As further shown in FIG. 4, process 400 may include determining, based on the relative speed values, a univocal speed indicator for a driver of the vehicle (block 460). For example, the DSM platform (e.g., using computing resource 235, processor 320, memory 330, storage component 340, and/or the like) may determine, based on the relative speed values, a univocal speed indicator for a driver of the vehicle. In some implementations, the DSM platform may determine, based on the respective relative speed values, a univocal speed indicator, for a driver of the vehicle, that represents an overall degree to which the respective relative speed values exceed the threshold, during a time interval that includes the set of corresponding times, as described above. The overall degree may include an average degree, a weighted average degree, and/or the like.

In some implementations, the DSM platform may determine, by using linear interpolation between identified respective relative speed values, other respective relative speed values for times that are different from the set of corresponding times and that are within a time interval that includes the set of corresponding times. In some implementations, the DSM platform may determine, based on the identified respective relative speed values and the other respective relative speed values, a univocal speed indicator, for the driver of the vehicle, that represents an average degree to which the vehicle was speeding over the time interval.

As further shown in FIG. 4, process 400 may include performing a set of actions based on the univocal speed indicator (block 470). For example, the DSM platform (e.g., using computing resource 235, processor 320, memory 330, storage component 340, output component 360, communication interface 370, and/or the like) may perform a set of actions based on the univocal speed indicator, as described above.

In some implementations, the set of actions may include a first action to generate an interface to display a graphical image associated with the univocal speed indicator, and a second action to provide the interface for display on another device. Additionally, or alternatively, the set of actions may include one or more other actions, such as a third action to provide a safety tip to a user device associated with the driver of the vehicle, a fourth action to assign to an account of the driver a reward, and a fifth action to cause insurance data associated with the driver to update.

In some implementations, the DSM platform may generate the interface to display, as part of the graphical image, the univocal speed indicator in association with one or more other univocal speed indicators for one or more other drivers. In this case, the univocal speed indicator and the one or more other univocal speed indicators may provide a uniform metric that accounts for total average degrees to which the vehicle and one or more other vehicles are speeding at respective time intervals.

In some implementations, the overall degree to which the driver of the vehicle caused the respective relative speed values to exceed the threshold may be a first overall degree and the time interval may be a first time interval. In some implementations, the DSM platform may provide the graphical image for display on the other device in a manner that displays the univocal speed indicator in association with one or more other univocal speed indicators. The one or more other univocal speed indicators may include a particular univocal speed indicator that is based on a second overall degree to which other respective relative speed values, which correspond to a particular driver of another vehicle, exceed the threshold during a second time interval. The first overall degree may be greater than (or less than) the second overall degree, and a length of the second time interval may be greater than (or less than) a length of the first time interval.

In some implementations, the DSM platform may receive vehicle revolutions per minute (RPM) data that identifies a total RPM of an engine of the vehicle over the time interval. Additionally, or alternatively, the DSM platform may receive sensor data that identifies a set of trailing distances. In some implementations, the DSM platform may provide, as input to a data model that has been trained using machine learning, at least one of: the univocal speed indicator, the RPM data, and the sensor data, to cause the data model to output a univocal safety indicator for the driver of the vehicle. In some implementations, the DSM platform may generate the interface to display the graphical image based on the univocal safety indicator.

The foregoing disclosure provides illustration and description, but is not intended to be exhaustive or to limit the implementations to the precise form disclosed. Modifications and variations may be made in light of the above disclosure or may be acquired from practice of the implementations.

As used herein, the term "component" is intended to be broadly construed as hardware, firmware, or a combination of hardware and software.

As used herein, satisfying a threshold may, depending on the context, refer to a value being greater than the threshold, more than the threshold, higher than the threshold, greater than or equal to the threshold, less than the threshold, fewer than the threshold, lower than the threshold, less than or equal to the threshold, equal to the threshold, etc. Additionally, exceeding a threshold may, depending on the context, refer to a value being greater than the threshold, more than the threshold, higher than the threshold, greater than or equal to the threshold, equal to the threshold, etc.

Certain user interfaces have been described herein and/or shown in the figures. A user interface may include a graphical user interface, a non-graphical user interface, a text-based user interface, and/or the like. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
   determining, by a device and based on a data model trained on historical data associated with one or more vehicles at a set of geographic locations, a threshold;
   determining, by the device, a second set of relative speed values that exceed the threshold, identified from a first set of relative speed values,
      wherein the first set of relative speed values is determined based on a set of speed values associated with a vehicle, of the one or more vehicles, at the set of geographic locations and based on received speed limit data associated with the set of geographic locations;
   determining, by the device and based on the second set of relative speed values, a univocal speed indicator for a driver of the vehicle,
      wherein the univocal speed indicator represents an overall degree to which the second set of relative speed values exceed the threshold; and
   performing, by the device, a set of actions based on the univocal speed indicator.

2. The method of claim 1, wherein the data model outputs an overall univocal speed indicator for a group of drivers that previously operated the one or more vehicles at the set of geographic locations, and
   wherein the threshold is based on the overall univocal speed indicator.

3. The method of claim 1, further comprising:
   receiving data from the vehicle,
      wherein the data identifies at least one of:
         the set of geographic locations of the vehicle associated with a set of corresponding times, or
         speed data of the vehicle associated with the set of corresponding times; and
      wherein the univocal speed indicator represents the overall degree to which the second set of relative speed values exceed the threshold during a time interval that includes the set of corresponding times.

4. The method of claim 1, wherein a particular relative speed value of the second set of relative speed values represents a degree that a speed value associated with the vehicle, corresponding to a particular geographic location, of the set of geographic locations, is over or under a speed limit corresponding to the particular geographic location.

5. The method of claim 1, wherein the historical data includes at least one of:
   data associated with an engine of a particular vehicle of the one or more vehicles, or
   data associated with a distance between the particular vehicle and another vehicle of the one or more vehicles.

6. The method of claim 1, further comprising:
   determining, based on data received from the vehicle, the speed limit data associated with the set of geographic locations,
      wherein the data includes location data associated with the vehicle at a corresponding time.

7. The method of claim 1, wherein the set of actions include at least one of:
   providing safety recommendation data to another device associated with a driver of the vehicle,
   providing reward data to an account associated with the driver, or
   providing insurance data to update insurance information associated with the driver.

8. A device, comprising:
   one or more processors configured to:
      determine, based on a data model trained on historical data associated with one or more vehicles at a set of geographic locations, a threshold;
      determine a second set of relative speed values that exceed the threshold, identified from a first set of relative speed values,
         wherein the first set of relative speed values is determined based on a set of speed values associated with a vehicle, of the one or more vehicles, at the set of geographic locations and based on received speed limit data associated with the set of geographic locations;
      determine, based on the second set of relative speed values, a univocal speed indicator for a driver of the vehicle,
         wherein the univocal speed indicator represents an overall degree to which the second set of relative speed values exceed the threshold; and
      perform a set of actions based on the univocal speed indicator.

9. The device of claim 8, wherein the data model outputs an overall univocal speed indicator for a group of drivers that previously operated the one or more vehicles at the set of geographic locations, and
   wherein the threshold is based on the overall univocal speed indicator.

10. The device of claim 8, wherein the one or more processors are configured to:
    receive data from the vehicle,
       wherein the data identifies at least one of:
          the set of geographic locations of the vehicle associated with a set of corresponding times, or
          speed data of the vehicle associated with the set of corresponding times; and
       wherein the univocal speed indicator represents the overall degree to which the second set of relative speed values exceed the threshold during a time interval that includes the set of corresponding times.

11. The device of claim 8, wherein a particular relative speed value of the first set of relative speed values represents a degree that a speed value, associated with the vehicle, corresponding to a particular geographic location, of the set of geographic locations, is over or under a speed limit corresponding to the particular geographic location.

12. The device of claim 8, wherein the historical data includes at least one of:
    engine data associated with an engine of a particular vehicle of the one or more vehicles, or
    distance data associated with a distance between the particular vehicle and another vehicle of the one or more vehicles.

13. The device of claim 8, wherein the one or more processors are further configured to:

determine, based on data received from the vehicle, the speed limit data associated with the set of geographic locations,
wherein the data includes location data associated with the vehicle at a corresponding time.

14. The device of claim 8, wherein the set of actions include at least one of:
providing safety recommendation data to another device associated with a driver of the vehicle,
providing reward data to an account associated with the driver, or
providing insurance data to update insurance information associated with the driver.

15. A non-transitory computer-readable medium storing a set of instructions, the set of instructions comprising:
one or more instructions that, when executed by one or more processors of a device, cause the device to:
determine, based on a data model trained on historical data associated with one or more vehicles at a set of geographic locations, a threshold;
determine a second set of relative speed values that exceed the threshold, identified from a first set of relative speed values,
wherein the first set of relative speed values is determined based on a set of speed values associated with a vehicle, of the one or more vehicles, at the set of geographic locations and based on received speed limit data associated with the set of geographic locations;
determine, based on the second set of relative speed values, a univocal speed indicator for a driver of the vehicle,
wherein the univocal speed indicator represents an overall degree to which the second set of relative speed values exceed the threshold; and
perform a set of actions based on the univocal speed indicator.

16. The non-transitory computer-readable medium of claim 15, wherein the data model outputs an overall univocal speed indicator for a group of drivers that previously operated the one or more vehicles at the set of geographic locations, and
wherein the threshold is based on the overall univocal speed indicator.

17. The non-transitory computer-readable medium of claim 15, wherein the one or more instructions, when executed by one or more processors of the device, further cause the device to:
receive data from the vehicle,
wherein the data identifies at least one of:
the set of geographic locations of the vehicle associated with a set of corresponding times, or
speed data of the vehicle associated with the set of corresponding times; and
wherein the univocal speed indicator represents the overall degree to which the second set of relative speed values exceed the threshold during a time interval that includes the set of corresponding times.

18. The non-transitory computer-readable medium of claim 15, wherein a particular relative speed value of the second set of relative speed values represents a degree that a speed value associated with the vehicle, corresponding to a particular geographic location, of the set of geographic locations, is over or under a speed limit corresponding to the particular geographic location.

19. The non-transitory computer-readable medium of claim 15, wherein the historical data includes at least one of:
engine data associated with an engine of a particular vehicle of the one or more vehicles, or
distance data associated with a distance between the particular vehicle and another vehicle of the one or more vehicles.

20. The non-transitory computer-readable medium of claim 15, wherein the set of actions include at least one of:
providing safety recommendation data to another device associated with a driver of the vehicle,
providing reward data to an account associated with the driver, or
providing insurance data to update insurance information associated with the driver.

* * * * *